United States Patent
Tatewaki et al.

(10) Patent No.: US 9,199,631 B2
(45) Date of Patent: Dec. 1, 2015

(54) COAST STOP VEHICLE

(75) Inventors: Keichi Tatewaki, Atsugi (JP); Hideshi Wakayama, Hadano (JP); Naohiro Yamada, Atsugi (JP)

(73) Assignee: JATCO LTD, Fuji-Shi (JP)

( * ) Notice: Subject to any disclaimer, the term of this patent is extended or adjusted under 35 U.S.C. 154(b) by 13 days.

(21) Appl. No.: 14/124,070

(22) PCT Filed: May 10, 2012

(86) PCT No.: PCT/JP2012/061984
§ 371 (c)(1),
(2), (4) Date: Dec. 5, 2013

(87) PCT Pub. No.: WO2012/172891
PCT Pub. Date: Dec. 20, 2012

(65) Prior Publication Data
US 2014/0106933 A1    Apr. 17, 2014

(30) Foreign Application Priority Data
Jun. 14, 2011 (JP) .................................. 2011-132429

(51) Int. Cl.
- *F16H 61/00* (2006.01)
- *B60W 10/04* (2006.01)
- *B60W 10/196* (2012.01)
- *F16H 61/02* (2006.01)
- *B60W 10/10* (2012.01)

(52) U.S. Cl.
CPC ............ *B60W 10/196* (2013.01); *B60W 10/10* (2013.01); *F16H 61/02* (2013.01); *Y10T 477/644* (2015.01)

(58) Field of Classification Search
CPC .................. B60W 10/107; B60W 30/18072; B60W 2510/1075; B60W 2510/108; B60W 2710/1077; B60W 2710/1083; B60W 2710/1088; F16H 2007/0812; F16H 9/26; F16H 61/66; F16H 61/662; F16H 2061/66286
USPC ............................ 477/37–38, 45, 47, 50, 906
See application file for complete search history.

(56) References Cited

U.S. PATENT DOCUMENTS

| | | | |
|---|---|---|---|
| 4,631,043 A * | 12/1986 | Tokoro et al. | 474/18 |
| 6,183,389 B1 * | 2/2001 | Tabata | 477/5 |
| 2003/0230461 A1 | 12/2003 | Sakata et al. | |
| 2006/0190145 A1 * | 8/2006 | Yamamoto et al. | 701/22 |
| 2010/0167871 A1 * | 7/2010 | Inagaki et al. | 477/5 |
| 2012/0209495 A1 * | 8/2012 | Sakai et al. | 701/102 |

FOREIGN PATENT DOCUMENTS

| | | |
|---|---|---|
| JP | 2004-019769 | 1/2004 |
| JP | 2007-247910 A | 9/2007 |

* cited by examiner

*Primary Examiner* — Justin Holmes
*Assistant Examiner* — Tinh Dang
(74) *Attorney, Agent, or Firm* — Foley & Lardner LLP (57) ABSTRACT

A coast stop vehicle for stopping a drive source during vehicle running includes a power transmission means arranged between the drive source and drive wheels, a coast stop control means for executing a coast stop control to stop the drive source when a coast stop condition for stopping the drive source holds during the vehicle running, an electrical oil pump for supplying oil to the power transmission means during the coast stop control, a slip detection means for detecting a slip in the power transmission means during the coast stop control, and an electrical oil pump control means for causing the electrical oil pump to discharge a second discharge pressure higher than a first discharge pressure set before the slip in the power transmission means occurs when the slip occurs in the power transmission means during the coast stop control.

12 Claims, 11 Drawing Sheets

COAST STOP VEHICLE

TECHNICAL FIELD

The present invention relates to a coast stop vehicle.

BACKGROUND ART

Conventionally, it is disclosed in JP2007-247910A to supply a hydraulic pressure to a power transmission unit or the like by driving an electric oil pump when a drive source is stopped.

SUMMARY OF INVENTION

When a drive source is stopped, a discharge pressure of an electrical oil pump needs to be set not to cause a slip due to a shortage of a supply pressure to a power transmission unit.

If the discharge pressure of the electrical oil pump is set to be too high, the electrical oil pump is excessively driven, which leads to deterioration of fuel economy and deteriorated durability of the electrical oil pump due to driving in an overload state.

Thus, the discharge pressure of the electrical oil pump is set at a minimum low value of pressure which does not cause a slip in the power transmission unit.

However, even if the electrical oil pump is controlled to have such a value as not to cause a slip, a slip occurs in the power transmission unit, leading to problems of degrading the power transmission unit and reducing durability of the power transmission unit due to a deceleration change, variations of components, a shortage of the discharge pressure of the electrical oil pump caused by a change in the viscosity of hydraulic oil, or a shortage of the supply pressure to the power transmission unit caused by an increase in the amount of oil necessary for other than the power transmission unit (for example, oil supplied to the power transmission unit temporarily becomes insufficient due to an increase in the amount of oil necessary for lubrication since the amount of lubricant is increased to prevent a further increase in oil temperature in an operating state where oil temperature increases).

The present invention was developed to solve such problems and aims to suppress the occurrence of a slip in a power transmission unit during a coast stop control, suppress degradation of the power transmission unit and improve durability of the power transmission unit.

A coast stop vehicle according to a certain aspect of the present invention is a coast stop vehicle for stopping a drive source during vehicle running and includes a power transmission means arranged between the drive source and drive wheels, a coast stop control means for executing a coast stop control to stop the drive source when a coast stop condition for stopping the drive source holds during the vehicle running, an electrical oil pump for supplying oil to the power transmission means during the coast stop control, a slip detection means for detecting a slip in the power transmission means during the coast stop control, and an electrical oil pump control means for causing the electrical oil pump to discharge a second discharge pressure higher than a first discharge pressure set before the slip in the power transmission means occurs when the slip occurs in the power transmission means during the coast stop control.

According to this aspect, when a slip in the power transmission means is detected during the coast stop control, it is possible to suppress the slip in the power transmission means and improve durability of the power transmission means by increasing the discharge pressure of the electrical oil pump.

DESCRIPTION OF EMBODIMENTS

Hereinafter, embodiments of the present invention are described with reference to the accompanying drawings. It should be noted that, in the following description, a "speed ratio" of a certain transmission mechanism is a value obtained by dividing an input rotation speed of this transmission mechanism by an output rotation speed thereof. Further, a "lowest speed ratio" is a maximum speed ratio of this transmission mechanism used such as at the time of starting a vehicle. A "highest speed ratio" is a minimum speed ratio of this transmission mechanism.

Figure 1:
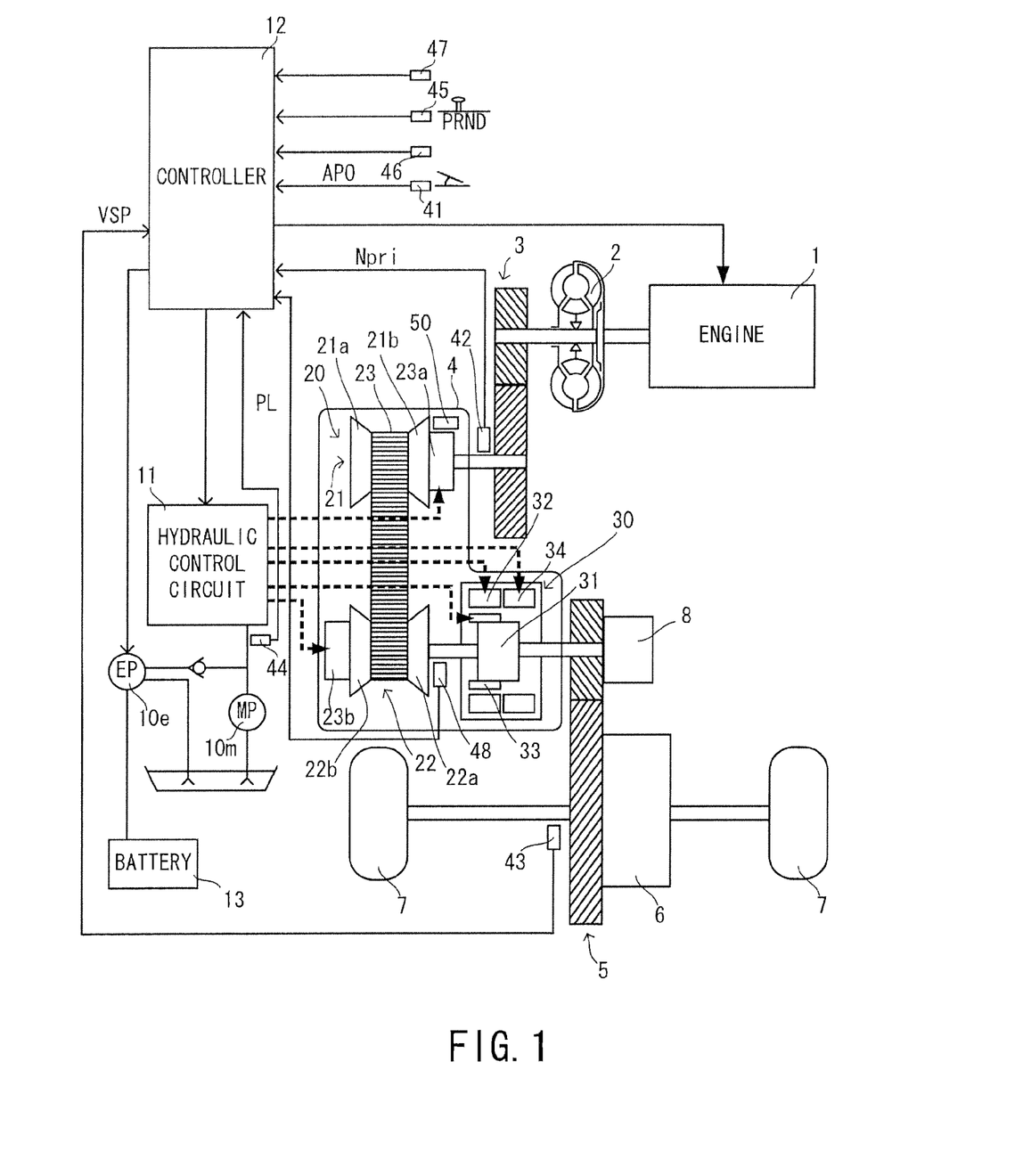
FIG. 1 is a schematic configuration diagram of a coast stop vehicle according to a first embodiment of the present invention.

FIG. 1 is a schematic configuration diagram of a coast stop vehicle according to the embodiments of the present invention. This vehicle includes an engine 1 as a drive source, and output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final speed reducer 6. The second gear train 5 includes a parking mechanism 8 for mechanically and unrotatably locking an output shaft of the transmission 4 in a parked state.

The transmission 4 includes a mechanical oil pump 10m to which the rotation of the engine 1 is input and which is driven by utilizing a part of power of the engine 1 and an electrical oil pump 10e which is driven upon receiving the supply of power from a battery 13. The electrical oil pump 10e is composed of an oil pump main body, an electric motor and a motor driver for driving and rotating the oil pump main body, and can control an operating load to an arbitrary load or in multiple steps. Further, the transmission 4 includes a hydraulic control circuit 11 for adjusting a hydraulic pressure (hereinafter, referred to as a "line pressure PL") from the mechanical oil pump 10m or the electrical oil pump 10e and supplying the adjusted hydraulic pressure to each component of the transmission 4.

The transmission 4 includes a belt type continuously variable transmission mechanism (hereinafter, referred to as a "variator 20") and a sub-transmission mechanism (power transmission means) 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected before (at input shaft side of) the variator 20.

The variator 20 includes a primary pulley 21, a secondary pulley 22 and a V-belt 23 mounted between the pulleys 21 and 22. Each of the pulleys 21, 22 includes a fixed conical plate 21a, 22a, a movable conical plate 21b, 22b arranged with a sheave surface faced toward the fixed conical plate 21a, 22a and forming a V-groove between the fixed conical plate 21a, 22a and the movable conical plate 21b, 22b, and a hydraulic cylinder 23a, 23b provided on the back surface of this movable conical plate 21b, 22b for displacing the movable conical plate 21b, 22b in an axial direction. When hydraulic pressures supplied to the hydraulic cylinders 23a, 23b are adjusted, the widths of the V-grooves change to change contact radii of the V-belt 23 and the respective pulleys 21, 22, whereby a speed ratio of the variator 20 continuously changes. Further, the variator 20 includes a stopper 50 for restricting a movement of the movable conical plate 21b in a direction to widen the V-groove of the primary pulley 21 so that the V-belt 23 does not come off. It should be noted that when the speed ratio reaches the lowest speed ratio, a predetermined hydraulic pressure is supplied to the hydraulic cylinder 23a of the primary pulley 21 and the movable conical plate 21b does not come into contact with the stopper 50.

A pressure receiving area of the hydraulic cylinder 23a of the primary pulley 21 is preferably large so as to have a large torque capacity even if the hydraulic pressure supplied to the hydraulic cylinder 23a of the primary pulley 21 is low. The primary pulley 21 and the secondary pulley 22 are so provided that the pressure receiving area of the primary pulley 21 is larger than that of the secondary pulley 22.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If a supply hydraulic pressure to each frictional engagement element 32 to 34 is adjusted to change engaged and released states of each frictional engagement element 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The transmission mechanism 30 is set to a second gear position with a speed ratio smaller than in the first gear position if the high clutch 33 is engaged and the low brake 32 and the reverse brake 34 are released. Further, the sub-transmission mechanism 30 is set to a reverse gear position if the reverse brake 34 is engaged and the low brake 32 and the high clutch 33 are released.

Each of the frictional engagement elements 32 to 34 is provided before or after the variator 20 on the power transmission path and any of them enables power transmission of the transmission 4 when being engaged while disabling power transmission of the transmission 4 when being released.

The hydraulic control circuit 11 is composed of a plurality of flow passages and a plurality of hydraulic control valves. In accordance with a transmission control signal from a controller 12, the hydraulic control circuit 11 controls the plurality of hydraulic control valves to switch supply paths of the hydraulic pressure, prepares a necessary hydraulic pressure from a hydraulic pressure produced by the mechanical oil pump 10m or the electrical oil pump 10e, and supplies this hydraulic pressure to each component of the transmission 4. In this way, the speed ratio of the variator 20 and the gear position of the sub-transmission mechanism 30 are changed to shift the transmission 4.

Figure 2:
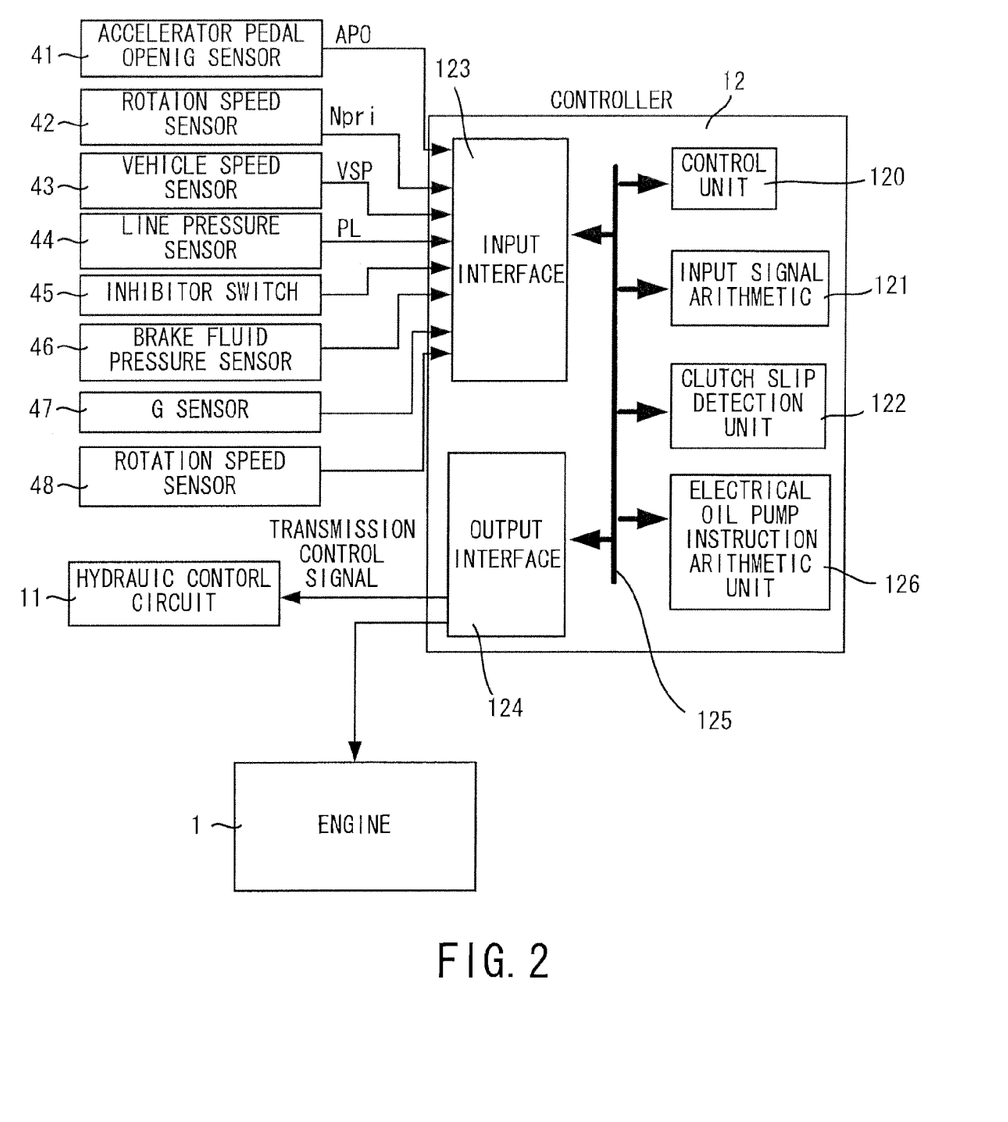
FIG. 2 is a schematic block diagram of a controller of the first embodiment.

The controller 12 is a controller for controlling the engine 1 and the transmission 4 in a comprehensive manner and composed of an input interface 123, an output interface 124, an input signal arithmetic unit 121, a clutch slip detection unit 122, an electrical oil pump instruction arithmetic unit 126, a control unit 120, and a bus 125 which connects these components to each other as shown in FIG. 2. The controller is composed of a CPU, a ROM, a RAM and the like, and functions of the controller 12 are fulfilled by the CPU reading a program stored in the ROM.

To the input interface 123 are input an output signal of an accelerator pedal opening sensor 41 for detecting an accelerator pedal opening APO which is an operated amount of an accelerator pedal, an output signal of a rotation speed sensor 42 for detecting an input rotation speed of the transmission 4 (=rotation speed of the primary pulley 21, hereinafter, referred to as a "primary rotation speed Npri"), a rotation speed sensor 48 for detecting an output rotation speed of the transmission 4 (=rotation speed of the secondary pulley 22, hereinafter, referred to as a "secondary rotation speed Nsec"), an output signal of a vehicle speed sensor 43 for detecting a vehicle speed VSP, an output signal of a line pressure sensor 44 for detecting a line pressure PL, an output signal of an inhibitor switch 45 for detecting the position of a select lever, an output signal of a brake fluid pressure sensor 46 for detecting a brake fluid pressure, an output signal of a G-sensor 47 and like output signals.

The input signal arithmetic unit 121 calculates an input rotation speed of the sub-transmission mechanism 30 from the output signal of the rotation speed sensor 42 and calculates an output rotation speed of the sub-transmission mechanism 30 from the output signal of the vehicle speed sensor 43.

The control unit 120 is connected to the input interface 123, the input signal arithmetic unit 121 and the like and controls the vehicle including these. The control unit 120 applies various arithmetic processings to various signals input via the input interface 123 to generate a transmission control signal and the like, and outputs the generated signals to the hydraulic control circuit 11 and the engine 1 via the output interface 124.

The control unit 120 executes a coast stop control described below to suppress a fuel consumption amount.

The coast stop control is a control for suppressing the fuel consumption amount by automatically stopping the engine 1 (coast stop) while the vehicle is running in a low speed range. The coast stop control is common to a fuel-cut control performed when an accelerator is off in that fuel supply to the engine 1 is stopped, but differs therefrom in that the power transmission path between the engine 1 and the drive wheels 7 is cut off to completely stop the rotation of the engine 1 by releasing the lock-up clutch.

In executing the coast stop control, the control unit 120 first judges, for example, conditions a to d listed below. These conditions are, in other words, conditions for judging whether or not a driver has an intention to stop the vehicle.

a: Accelerator pedal is not depressed at all (accelerator pedal opening APO=0).

b: Brake pedal is depressed (brake fluid pressure is not lower than a predetermined value).

c: Vehicle speed is a predetermined low speed (e.g. 15 km/h) or lower.

d: Lock-up clutch is released.

When all of these coast stop conditions are satisfied, the control unit 120 executes the coast stop control.

When the coast stop control is executed, a hydraulic pressure necessary for the low brake 32, the variator 20 and the like is generated by the electrical oil pump 10e to completely stop the rotation of the engine 1. A discharge pressure of the electrical oil pump 10e is calculated by the electrical oil pump instruction arithmetic unit 126 and a drive signal for the electrical oil pump 10e is output based on the calculated discharge pressure. The electrical oil pump 10e is controlled based on the drive signal.

A control of the electrical oil pump 10e when the coast stop control is executed is described in detail below.

When the coast stop control is executed, the electrical oil pump 10e discharges a first discharge pressure to be described in detail later and engages the low brake 32 so as not to cause a slip in the low brake 32. The first discharge pressure is set at such a value that a slip does not occur in the low brake 32, fuel economy is not deteriorated and a load of the electrical oil pump 10e is not increased in such a vehicle deceleration state where the coast stop control is executed. Thus, the hydraulic pressure does not normally become insufficient in the low brake 32 during the coast stop control. However, the hydraulic pressure supplied to the low brake 32 may become insufficient and a slip may occur in the low brake 32 due to variations of components, a change in the viscosity of hydraulic oil or an increase in the amount of oil supplied to components other than the low brake 32.

In the present embodiment, a state of the low brake 32 is detected by the clutch slip detection unit 122, and the discharge pressure of the electrical oil pump 10e is calculated to suppress a slip in the low brake 32 and a drive signal for the electrical oil pump 10e is output by the electrical oil pump instruction arithmetic unit 126.

Figure 3:
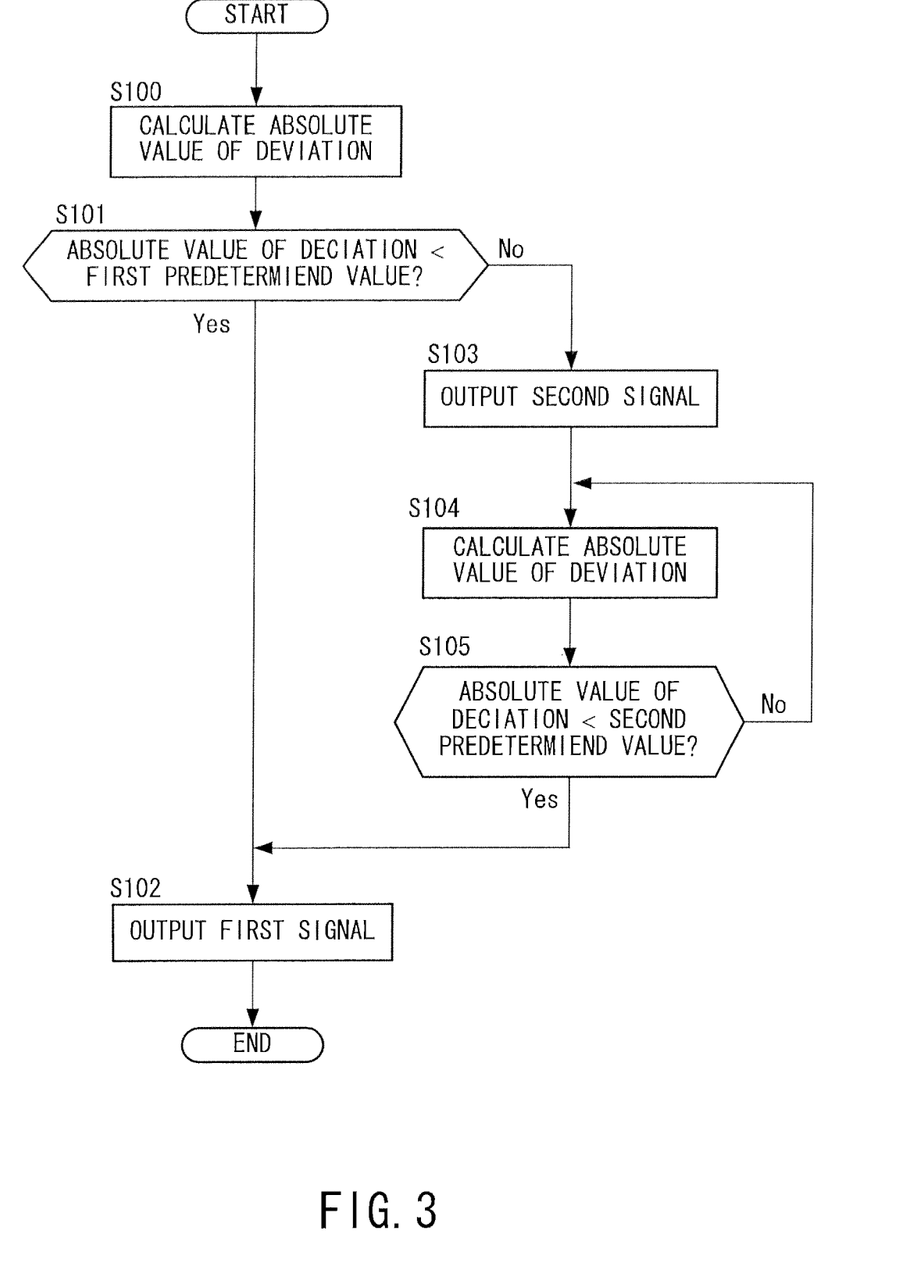
FIG. 3 is a flow chart showing a control in a clutch slip detection unit of the first embodiment.

The clutch slip detection unit 122 detects the state of the low brake 32 based on a flow chart shown in FIG. 3 when the coast stop control is executed.

In Step S100, the clutch slip detection unit 122 obtains an input-side rotation speed and an output-side rotation speed from the input signal arithmetic unit 121 and calculates an absolute value of a deviation between the input-side rotation speed and the output-side rotation speed.

In Step S101, the clutch slip detection unit 122 determines whether there is a slip in the low brake 32. Specifically, the clutch slip detection unit 122 determines whether or not the absolute value of the deviation between the input-side rotation speed and the output-side rotation speed is smaller than a first predetermined value. The clutch slip detection unit 122 proceeds to Step S102 if the absolute value of the deviation is smaller than the first predetermined value while proceeding to Step S103 if the absolute value of the deviation is not smaller than the first predetermined value. The first predetermined value is a value capable of determining that there is a slip in the low brake 32, and set in advance.

In Step S102, the clutch slip detection unit 122 determines that there is no slip in the low brake 32 and outputs a first signal.

In Step S103, the clutch slip detection unit 122 determines that there is a slip in the low brake 32 and outputs a second signal.

In Step S104, the clutch slip detection unit 122 obtains the input-side rotation speed and the output-side rotation speed from the input signal arithmetic unit 121 and calculates an absolute value of a deviation between the input-side rotation speed and the output-side rotation speed.

In Step S105, the clutch slip detection unit 122 determines whether or not the slip of the low brake 32 has converged. Specifically, the clutch slip detection unit 122 determines whether or not the absolute value of the deviation between the input-side rotation speed and the output-side rotation speed is smaller than a second predetermined value. The clutch slip detection unit 122 determines that the slip of the low brake 32 has converged and proceeds to Step S102 if the absolute value of the deviation is smaller than the second predetermined value while determining that the slip of the low brake 32 has not converged yet and returning to Step S104 to repeat the above control if the absolute value of the deviation is not smaller than the second predetermined value. The second predetermined value is a value capable of determining that the slip of the low brake 32 has converged, and smaller than the first predetermined value.

The clutch slip detection unit 122 repeatedly executes the above control and outputs a signal indicating the state of the low brake 32 while the coast stop control is executed.

Figure 4:
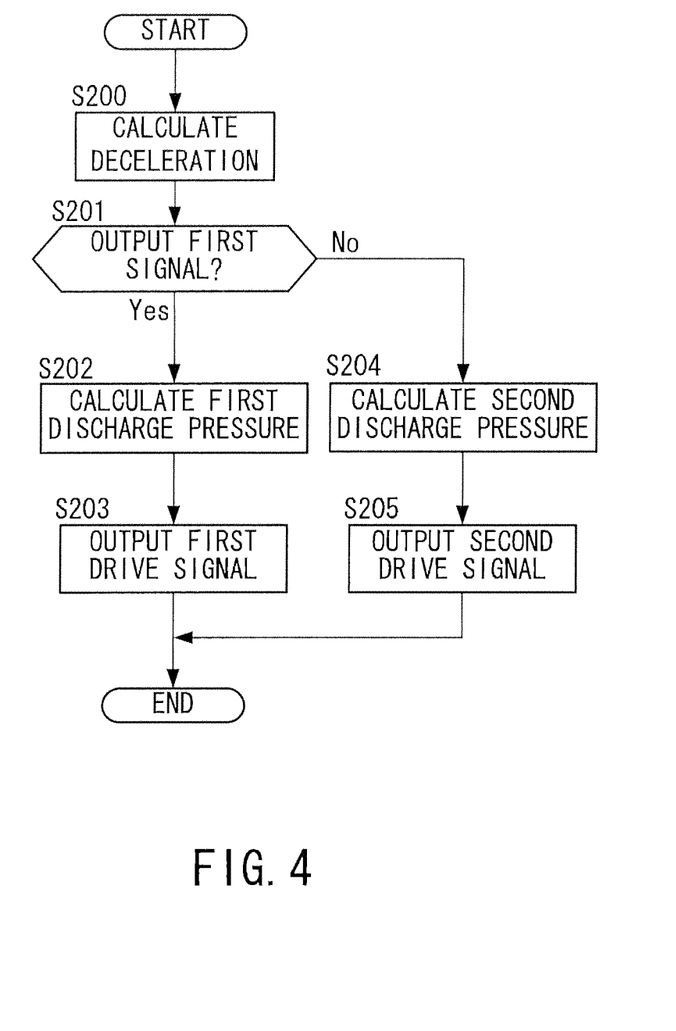
FIG. 4 is a flow chart showing a control in an electrical oil pump instruction arithmetic unit of the first embodiment.

The electrical oil pump instruction arithmetic unit 126 outputs a drive signal for the electrical oil pump 10e based on a flow chart shown in FIG. 4 when the coast stop control is executed.

In Step S200, the electrical oil pump instruction arithmetic unit 126 calculates a deceleration of the vehicle based on a signal from the G-sensor 47. The deceleration is negative when the vehicle is decelerating and becomes smaller toward zero, and indicates the acceleration of the vehicle when being positive. A large deceleration indicates a large magnitude on a negative side.

In Step S201, the electrical oil pump instruction arithmetic unit 126 determines whether or not the first signal is being output from the clutch slip detection unit 122. The electrical oil pump instruction arithmetic unit 126 proceeds to Step S202 since there is no slip in the low brake 32 if the first signal is output while proceeding to Step S204 since there is a slip in the low brake 32 if not the first signal, but the second signal is output.

Figure 5:
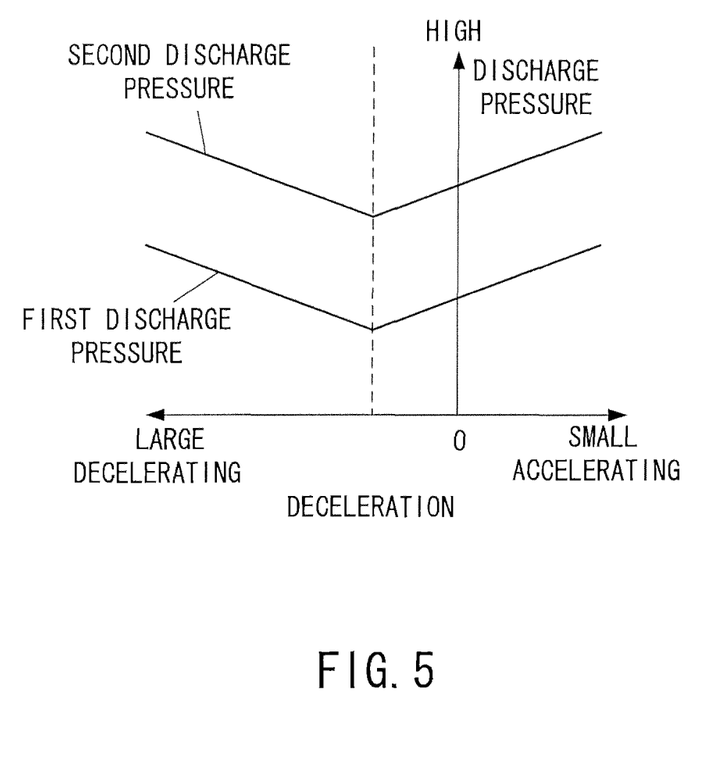
FIG. 5 is a graph showing a relationship between deceleration and discharge pressure of an electrical oil pump in the first embodiment.

In Step S202, the electrical oil pump instruction arithmetic unit 126 calculates the first discharge pressure of the electrical oil pump 10e from a map shown in FIG. 5 based on the deceleration. FIG. 5 is a graph showing a relationship between the deceleration and the discharge pressure of the electrical oil pump 10e. As shown in FIG. 5, the first discharge pressure becomes a minimum pressure at a certain deceleration. Since the engine 1 is stopped when the coast stop control is executed, the input-side rotation speed of the low brake 32 decreases. Thus, when the vehicle is decelerating, there is a deceleration at which the input-side rotation speed and the output-side rotation speed of the low brake 32 coincide. At this deceleration, there is no slip in the low brake 32 regardless of an engaging force of the low brake 32, and the discharge pressure of the electrical oil pump 10e can be minimized. This deceleration is present on a deceleration side. As the deceleration is shifted toward the deceleration side or an acceleration side from the certain deceleration at which there is no slip in the low brake 32, a difference between the input-side rotation speed and the output-side rotation speed of the low brake 32 tends to increase and a slip tends to occur. Thus, an engaging force of the low brake 32 necessary to prevent the occurrence of a slip increases and the discharge pressure of the electrical oil pump 10e also increases.

In Step S203, the electrical oil pump instruction arithmetic unit 126 outputs a first drive signal corresponding to the first discharge pressure.

In Step S204, the electrical oil pump instruction arithmetic unit 126 calculates a second discharge pressure from the map shown in FIG. 5 based on the deceleration. Even if the electrical oil pump 10e is driven so that the discharge pressure reaches the first discharge pressure, the hydraulic pressure supplied to the low brake 32 may become insufficient and a slip may occur in the low brake 32 due to variations of components, a change in the viscosity of hydraulic oil or an increase in the amount of oil supplied to components other than the low brake 32. Thus, the electrical oil pump instruction arithmetic unit 126 calculates the second discharge pressure higher than the first discharge pressure if the occurrence of a slip in the low brake 32 is determined by the clutch slip detection unit 122. The second discharge pressure is higher than the first discharge pressure at the same deceleration and lower than a maximum discharge pressure of the electrical oil pump 10e and is set so that the low brake 32 in which a slip has occurred is not suddenly engaged.

In Step S205, the electrical oil pump instruction arithmetic unit 126 outputs a second drive signal corresponding to the second discharge pressure.

The electrical oil pump instruction arithmetic unit 126 repeatedly executes the above control and outputs a drive signal for the electrical oil pump 10c while the coast stop control is executed. The electrical oil pump 10e is driven based on the output drive signal.

Figure 6:
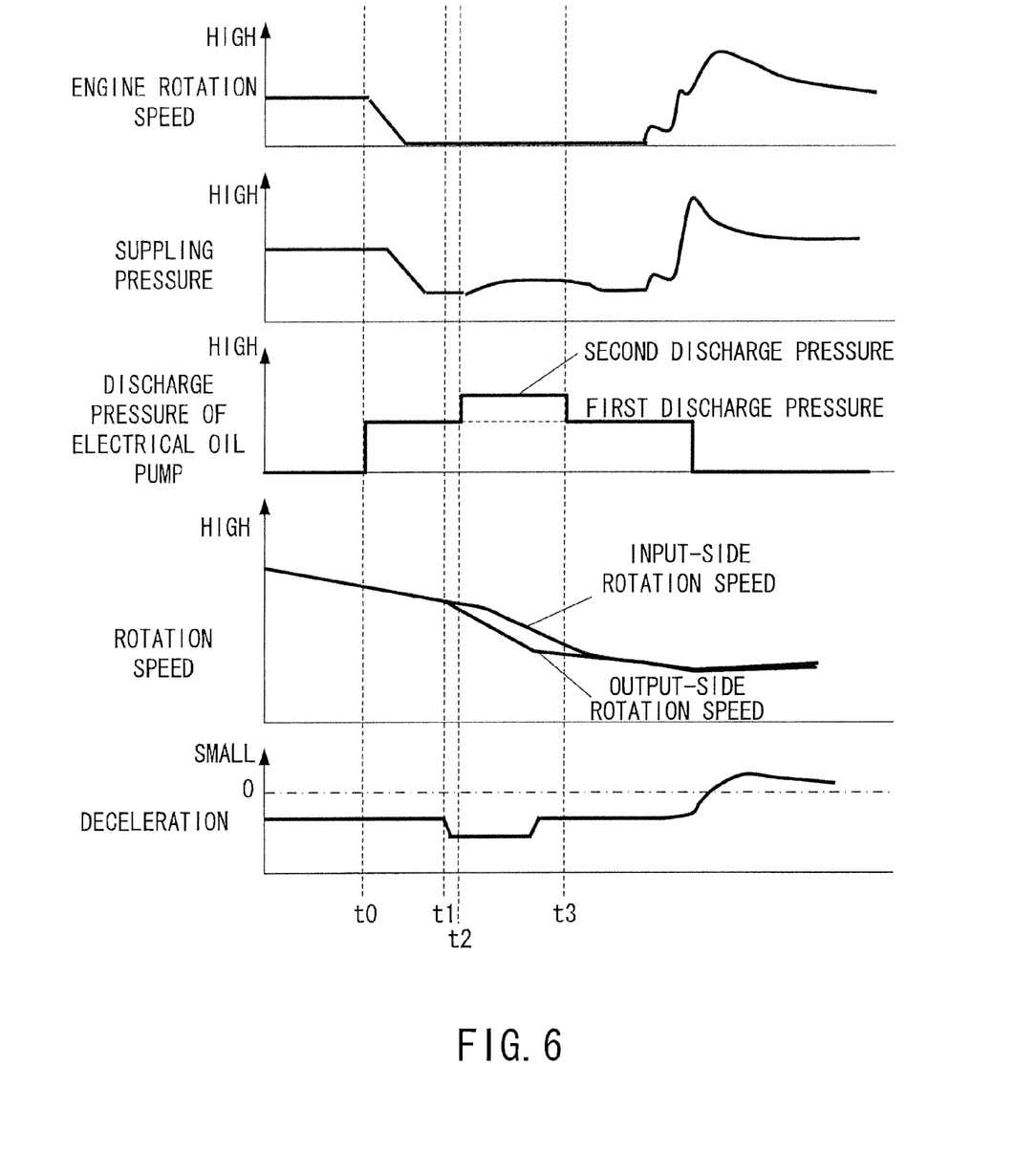
FIG. 6 is a time chart showing changes in the discharge pressure of the electrical oil pump and the like of the first embodiment.

Next, changes in the discharge pressure of the electrical oil pump 10e and the like in the present embodiment are described using a time chart of FIG. 6. FIG. 6 is the time chart showing changes in the discharge pressure of the electrical oil pump 10e and the like when the output-side rotation speed decreases at a faster rate than the input-side rotation speed.

When the coast stop control is started at time t0, an engine rotation speed decreases since fuel injection into the engine 1 is stopped. Further, the electrical oil pump 10e is driven when the coast stop control is started. Here, there is no slip in the low brake 32 and the electrical oil pump 10e discharges the first discharge pressure calculated based on the deceleration.

Since a supply source changes from the mechanical oil pump 10m to the electrical oil pump 10e, the hydraulic pressure supplied to the low brake 32 gradually decreases and, thereafter, reaches the hydraulic pressure supplied by the electrical oil pump 10e.

When a brake pedal is depressed more at time t1 and the absolute value of the deviation between the input-side rotation speed and the output-side rotation speed of the low brake 32 becomes larger than the first predetermined value at time t2, it is determined that there is a slip in the low brake 32. Then, the discharge pressure of the electrical oil pump 10e is changed to the second discharge pressure. In this way, the hydraulic pressure supplied to the low brake 32 increases to suppress the slip of the low brake 32.

When the absolute value of the deviation between the input-side rotation speed and the output-side rotation speed of the low brake 32 becomes smaller than the second predetermined value at time t3, it is determined that the slip of the low brake 32 has converged. Then, the discharge pressure of the electrical oil pump 10e is changed to the first discharge pressure calculated based on the deceleration.

Effects of the first embodiment of the present embodiment are described.

When a slip occurs in the low brake 32 during the coast stop control, the discharge pressure of the electrical oil pump 10e is changed from the first discharge pressure to the second discharge pressure higher than the first discharge pressure, whereby it is possible to suppress the slip of the low brake 32, suppress abrasion of the low brake 32 and improve durability of the low brake 32.

When an idle stop control for automatically stopping the engine 1 when the vehicle stops is executed, the input-side rotation speed and the output-side rotation speed of the sub-transmission mechanism 30 become both zero and a slip does not occur in the low brake 32 even if the discharge pressure of the electrical oil pump 10e decreases. Thus, a shock given to a driver is small even if the accelerator pedal is depressed by the driver during the idle stop control to restart the engine 1 and a discharge pressure generated by the mechanical oil pump 10m is supplied to the low brake 32 to engage the low brake 32.

However, since an input-side rotary shaft and an output-side rotary shaft of the sub-transmission mechanism 30 are rotated when the coast stop control is executed, a slip may occur in the low brake 32.

If the coast stop control is canceled and the engine 1 is restarted after a slip occurs in the low brake 32, the rotation speed of the engine 1 temporarily sharply increases. Associated with this, the discharge pressure of the mechanical oil pump 10m also temporarily increases and the hydraulic pressure supplied to the low brake 32 suddenly increases. If a slip occurs in the low brake 32 when the engine 1 is restarted, the low brake 32, which is a frictional engagement element, is suddenly engaged and a shock given to the driver becomes larger.

Since the slip in the low brake 32 can be suppressed during the coast stop control in the present embodiment, it is possible to suppress sudden engagement of the low brake 32, which is a frictional engagement element, and suppress a shock given to the driver when the coast stop control is canceled and the engine 1 is restarted.

Since the slip of the low brake 32 is calculated based on the deviation between the input-side rotation speed and the output-side rotation speed of the low brake 32, the occurrence of the slip in the low brake 32 can be accurately detected.

By setting the second discharge pressure to be lower than the maximum discharge pressure of the electrical oil pump 10e, it is possible to prevent sudden engagement of the low brake 32 and prevent the occurrence of a large engagement shock when the discharge pressure of the electrical oil pump 10c is set at the second discharge pressure.

The discharge pressure of the electrical oil pump 10e is set to the first discharge pressure when the slip of the low brake 32 has converged, and increased only when it is necessary for the convergence of the slip of the low brake 32. This can reduce power consumed by the electrical oil pump 10e, whereby it is possible to suppress a power generation amount of a generator by the rotation of the engine 1 and suppress deterioration of fuel economy. It is also possible to suppress a load increase of the electrical oil pump 10e and suppress a reduction in the durability of the electrical oil pump 10e.

Figure 7:
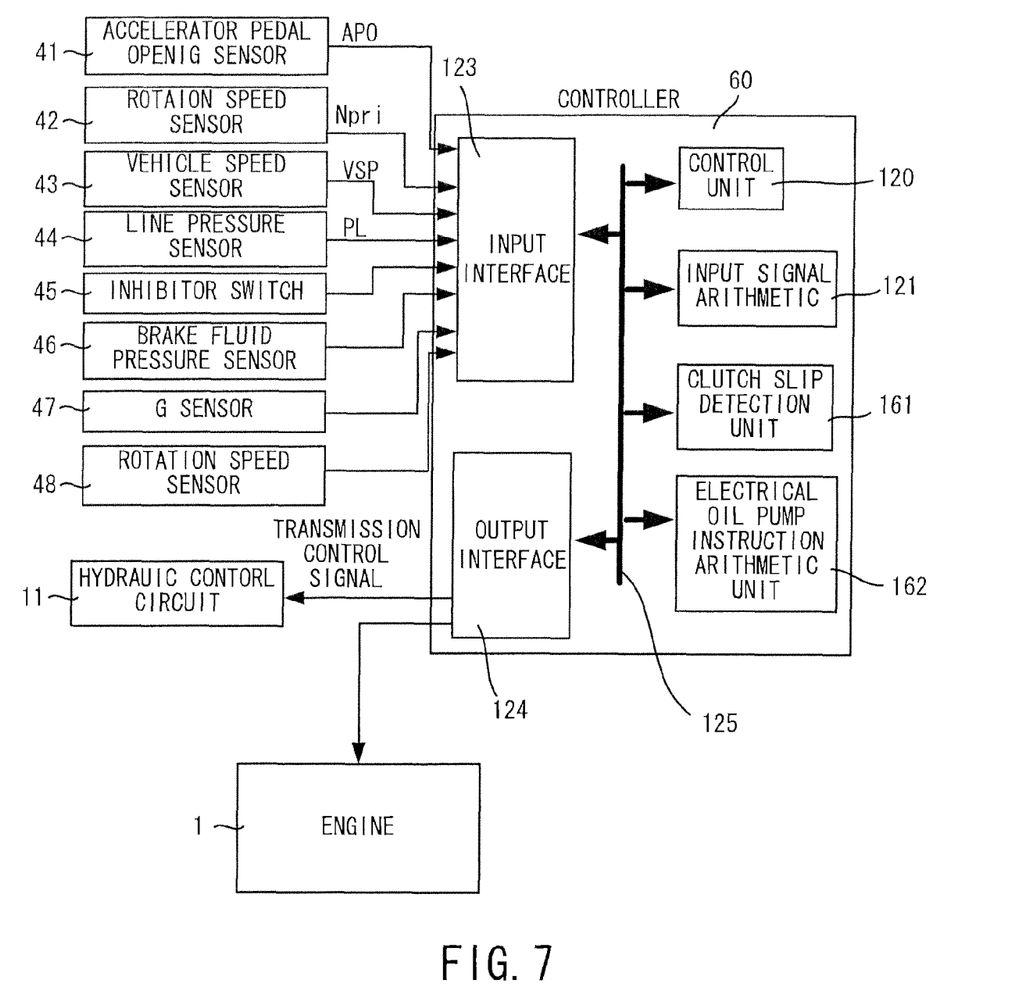
FIG. 7 is a schematic block diagram of a controller of a second embodiment.

Next, a second embodiment of the present invention is described using FIG. 7.

FIG. 7 is a schematic block diagram of a controller 60 of the present embodiment.

The present embodiment differs from the first embodiment in a clutch slip detection unit 161 and an electrical oil pump instruction arithmetic unit 162 of the controller 60. Here, differences from the first embodiment are described and the other configuration and the like are not described.

Figure 8:
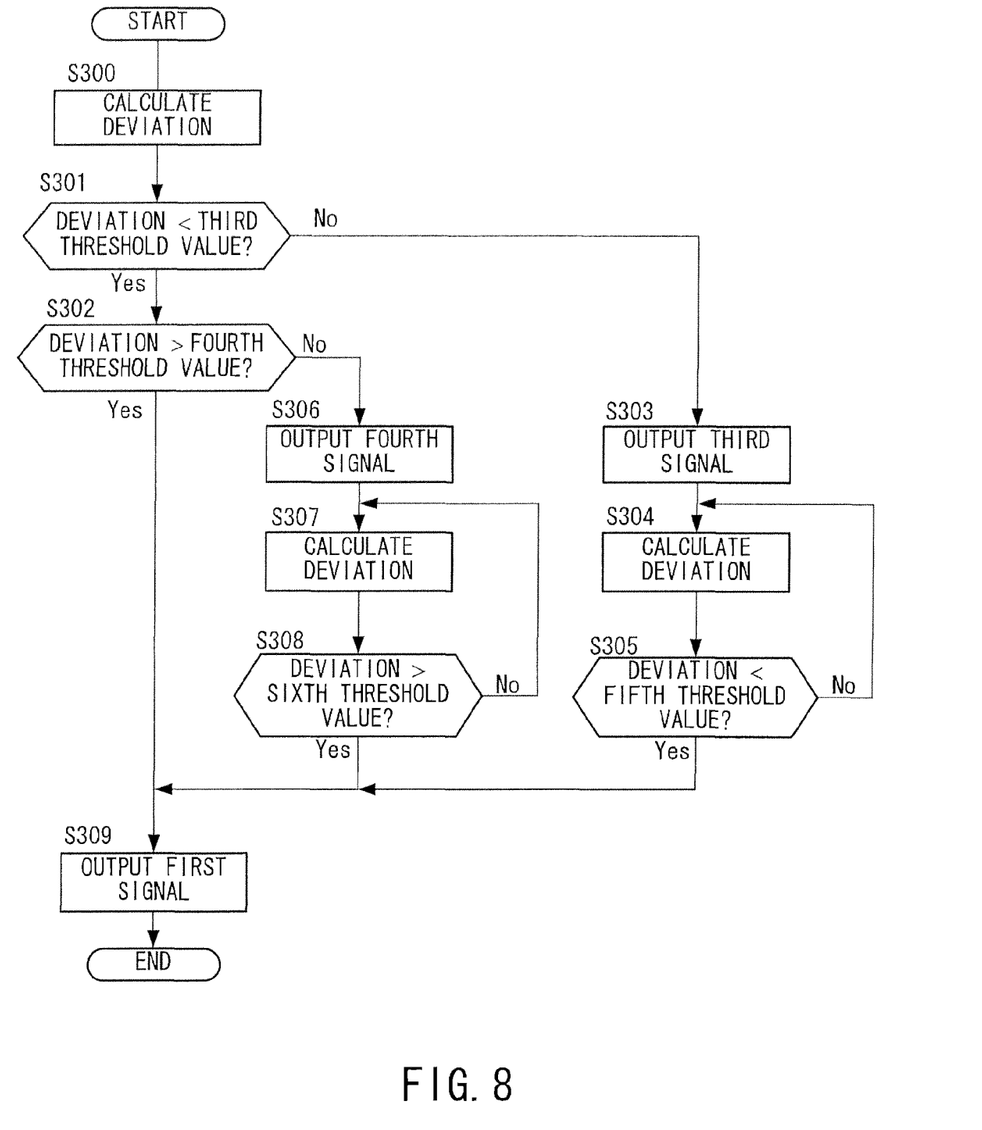
FIG. 8 is a flow chart showing a control in a clutch slip detection unit of the second embodiment.

The clutch slip detection unit 161 detects a state of a low brake 32 based on a flow chart shown in FIG. 8 when a coast stop control is executed.

In Step S300, the clutch slip detection unit 161 obtains an input-side rotation speed and an output-side rotation speed from an input signal arithmetic unit 121 and calculates a deviation between the input-side rotation speed and the output-side rotation speed by subtracting the input-side rotation speed from the output-side rotation speed.

During the coast stop control, the input-side rotation speed decreases since the rotation of an engine 1 is stopped. If a slip occurs in the low brake 32 in a state where a deceleration of a vehicle is low, i.e. a decreasing rate of the output-side rotation speed per unit time is small, the output-side rotation speed is higher than the input-side rotation speed. Thus, if a slip occurs in the low brake 32 in the state where the deceleration of the vehicle is small, the deviation calculated in Step S300 is a positive value. This state is referred to as slow deceleration below.

On the other hand, if a slip occurs in the low brake 32 in a state where the deceleration of the vehicle is high, the output-side rotation speed is lower than the input-side rotation speed since the decreasing rate of the output-side rotation speed per unit time is large. Thus, if the slip occurs in the low brake 32 in the state where the deceleration of the vehicle is high, the deviation calculated in Step S300 is a negative value. This state is referred to as quick deceleration below.

In Step S301, the clutch slip detection unit 161 compares the deviation calculated in Step S300 with a third threshold value, and proceeds to Step S302 if the deviation is smaller than the third threshold value while proceeding to Step S303 if the deviation is not smaller than the third threshold value. The third threshold value is a positive value capable of determining a faster decrease of the input-side rotation speed than the output-side rotation speed and the occurrence of the slip in the low brake 32 due to slow deceleration, and set in advance.

In Step S302, the clutch slip detection unit 161 compares the deviation calculated in Step S300 with a fourth threshold value, and proceeds to Step S309 if the deviation is larger than the fourth threshold value while proceeding to Step S306 if the deviation is not larger than the fourth threshold value. The fourth threshold value is a negative value capable of determining a faster decrease of the output-side rotation speed than the input-side rotation speed and the occurrence of the slip in the low brake 32 due to quick deceleration, and set in advance.

An absolute value of the third threshold value is smaller than that of the fourth threshold value. If a slip occurs in the low brake 32 and the coast stop control is canceled before the slip converges, the engine 1 is restarted, the hydraulic pressure is supplied by the mechanical oil pump 10m and the low brake 32 is suddenly engaged. A driver is more likely to feel an engagement shock when the low brake 32 is suddenly engaged at slow deceleration than when the low brake 32 is suddenly engaged at quick deceleration. Thus, in the case of slow deceleration, an absolute value of the threshold value is made smaller than in the case of quick deceleration, whereby the discharge pressure of the electrical oil pump 10e is increased earlier to cause the slip of the low brake 32 to converge.

In Step S303, the clutch slip detection unit 161 determines the occurrence of the slip in the low brake 32 at slow deceleration and outputs a third signal.

In Step S304, the clutch slip detection unit 161 calculates a deviation between the output-side rotation speed and the input-side rotation speed calculated by the input signal arithmetic unit 121 as in Step S300.

In Step S305, the clutch slip detection unit 161 compares the deviation calculated in Step S304 with a fifth threshold value and proceeds to Step S309 if the deviation is smaller than the fifth threshold value while returning to Step S304 to repeat the above control if the deviation is not smaller than the fifth threshold value. The fifth threshold value is a positive value smaller than the third threshold value and capable of determining that the slip of the low brake 32 has converged, and set in advance.

In Step S306, the clutch slip detection unit 161 determines the occurrence of the slip in the low brake 32 at quick deceleration and outputs a fourth signal.

In Step S307, the clutch slip detection unit 161 calculates a deviation between the output-side rotation speed and the input-side rotation speed calculated by the input signal arithmetic unit 121 as in Step S300.

In Step S308, the clutch slip detection unit 161 compares the deviation calculated in Step S307 with a sixth threshold value, and proceeds to Step S309 if the deviation is larger than the sixth threshold value while returning to Step S307 to repeat the above control if the deviation is not larger than the sixth threshold value. The sixth threshold value is a negative value larger than the fourth threshold value and capable of determining that the slip of the low brake 32 has converged, and set in advance.

In Step S309, the clutch slip detection unit 161 outputs a first signal.

The clutch slip detection unit 161 repeatedly executes the above control and outputs a signal indicating the state of the low brake 32 while the coast stop control is executed.

Figure 9:
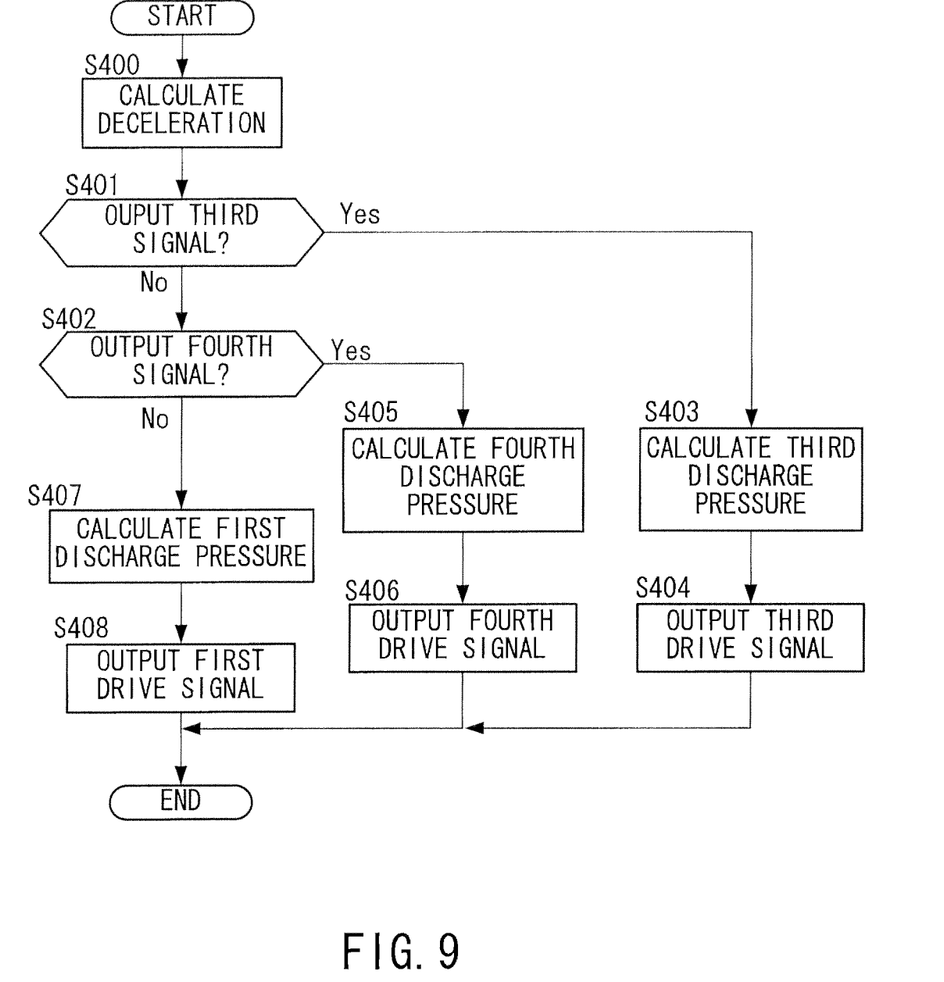
FIG. 9 is a flow chart showing a control in an electrical oil pump instruction arithmetic unit of the second embodiment.

The electrical oil pump instruction arithmetic unit 162 outputs a drive signal for the electrical oil pump 10e based on a flow chart shown in FIG. 9 when the coast stop control is executed.

In Step S400, the electrical oil pump instruction arithmetic unit 162 calculates a deceleration of the vehicle based on a signal from a G-sensor 47.

In Step S401, the electrical oil pump instruction arithmetic unit 162 determines whether or not a third signal is being output from the clutch slip detection unit 161. The electrical oil pump instruction arithmetic unit 162 determines the occurrence of a slip in the low brake 32 at slow deceleration and proceeds to Step S403 if the third signal is output while determining that there is no slip in the low brake 32 at slow deceleration and proceeding to Step S402 if the third signal is not output.

In Step S402, the electrical oil pump instruction arithmetic unit 162 determines whether or not a fourth signal is being output from the clutch slip detection unit 161. The electrical oil pump instruction arithmetic unit 162 determines the occurrence of a slip in the low brake 32 at quick deceleration and proceeds to Step S405 if the fourth signal is output while determining that there is no slip in the low brake 32 and proceeding to Step S407 if the fourth signal is not output.

Figure 10:
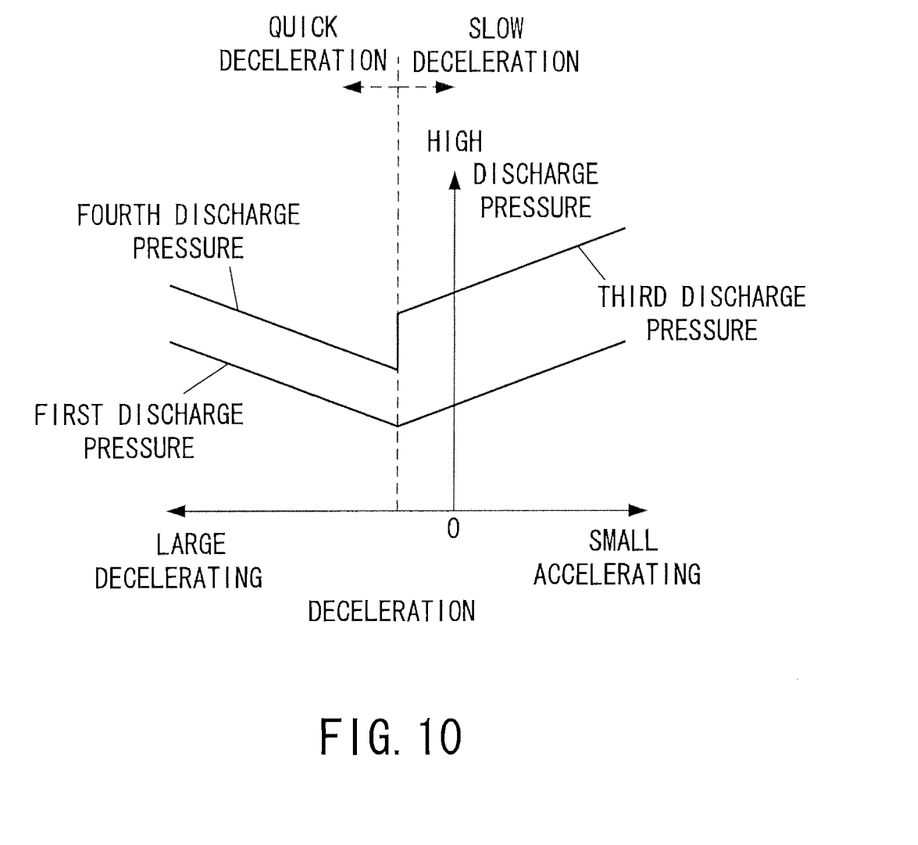
FIG. 10 is a graph showing a relationship between deceleration and discharge pressure of an electrical oil pump in the second embodiment.

In Step S403, the electrical oil pump instruction arithmetic unit 162 calculates a third discharge pressure of the electrical oil pump 10e from a map shown in FIG. 10 based on the deceleration. FIG. 10 is a graph showing a relationship between the deceleration and the discharge pressure of the electrical oil pump 10e. In a first slip which is a slip in the low brake 32 at slow deceleration, the discharge pressure (first discharge pressure, third discharge pressure) of the electrical oil pump 10e decreases with an increase in the deceleration. The third discharge pressure is higher than the first discharge pressure at the same deceleration.

In Step S404, the electrical oil pump instruction arithmetic unit 162 outputs a third drive signal corresponding to the third discharge pressure.

In Step S405, the electrical oil pump instruction arithmetic unit 162 calculates a fourth discharge pressure of the electrical oil pump 10e from the map shown in FIG. 10 based on the deceleration. In a second slip which is a slip in the low brake 32 at quick deceleration, the discharge pressure (first discharge pressure, fourth discharge pressure) of the electrical oil pump 10e increases with an increase in the deceleration. The fourth discharge pressure is higher than the first discharge pressure at the same deceleration.

In FIG. 10, an increment (difference between the third and first discharge pressures) in the discharge pressure of the electrical oil pump 10e at slow deceleration from the first discharge pressure that is a discharge pressure when there is no slip is larger than an increment (difference between the fourth and first discharge pressures) in the discharge pressure of the electrical oil pump 10e at quick deceleration.

If the coast stop control is canceled and the engine 1 is restarted before the slip of the low brake 32 converges, the hydraulic pressure supplied to the low brake 32 suddenly increases. Thus, an engagement shock occurs in the low brake 32. If engagement shocks of the same magnitude occur at slow deceleration and at quick deceleration, a driver is more likely to feel a sense of discomfort in the case of slow deceleration. This is because a sense of discomfort given to the driver is notable since vehicle deceleration when the engagement shock occurs is small, i.e. vehicle behavior is small at slow deceleration. On the other hand, since vehicle behavior is large at quick deceleration, it is difficult for the driver to feel the engagement shock. Thus, in the present embodiment, the increment in the discharge pressure of the electrical oil pump 10c at slow deceleration is made larger than that in the discharge pressure of the electrical oil pump 10e at quick deceleration. This suppresses the slip of the low brake 32 at slow deceleration and suppresses a sense of discomfort given to the driver when the coast stop control is canceled before the slip of the low brake 32 converges. On the other hand, if a slip occurs in the low brake 32 at quick deceleration, deterioration of fuel economy can be suppressed by making the increment in the discharge pressure of the electrical oil pump 10e smaller than that at slow deceleration to reduce power consumed by the electrical oil pump 10e.

In Step S406, the electrical oil pump instruction arithmetic unit 162 outputs a fourth drive signal corresponding to the fourth discharge pressure.

In Step S407, the electrical oil pump instruction arithmetic unit 162 calculates the first discharge pressure of the electrical oil pump 10e from the map shown in FIG. 10 based on the deceleration.

In Step S408, the electrical oil pump instruction arithmetic unit 162 outputs a first drive signal corresponding to the first discharge pressure.

The electrical oil pump instruction arithmetic unit 162 repeatedly executes the above control and outputs the drive signal for the electrical oil pump 10e while the coast stop control is executed.

Figure 11:
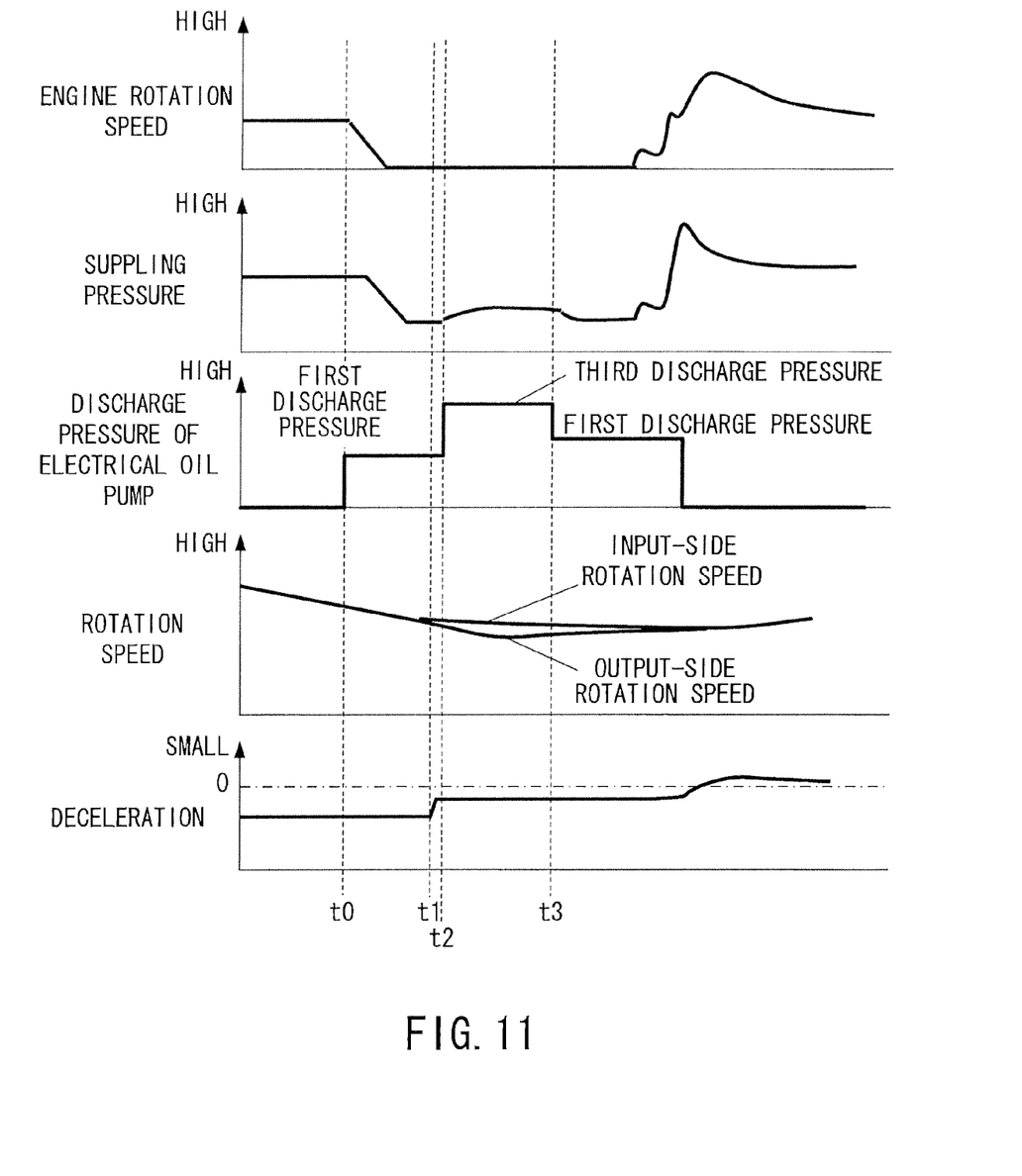
FIG. 11 is a time chart showing changes in the discharge pressure of the electrical oil pump and the like of the second embodiment.

Changes in the discharge pressure of the electrical oil pump 10e and the like in the present embodiment are described using a time chart of FIG. 11. FIG. 11 is the time chart showing changes in the discharge pressure of the electrical oil pump 10e and the like at slow deceleration. It should be noted that changes in the discharge pressure of the electrical oil pump 10e and the like at quick deceleration are as shown in the time chart of FIG. 6.

When the coast stop control is started at time t0, an engine rotation speed decreases since fuel injection into the engine 1 is stopped. Further, the electrical oil pump 10e is driven when the coast stop control is started. Here, there is no slip in the low brake 32 and the electrical oil pump 10e discharges the first discharge pressure calculated based on the deceleration.

When the deceleration decreases and a change amount of the output-side rotation speed becomes smaller at time L1 and the deviation between the output-side rotation speed and the input-side rotation speed increases to or above the third threshold value at time t2, it is determined that a slip occurs in the low brake 32 due to slow deceleration. Then, the discharge pressure of the electrical oil pump 10e is changed from the first discharge pressure to the third discharge pressure. In this way, the hydraulic pressure supplied to the low brake 32 increases to suppress the slip of the low brake 32.

If the coast stop control is canceled and the engine 1 is restarted before the slip of the low brake 32 converges, the low brake 32 is suddenly engaged by the oil discharged from the mechanical oil pump 10m. A driver is more likely to feel an engagement shock in the case of slow deceleration than in the case of quick deceleration. In the present embodiment, the slip of the low brake 32 is further suppressed at slow deceleration by making the third discharge pressure higher than the fourth discharge pressure that is a discharge pressure at quick deceleration.

When the deviation between the output-side rotation speed and the input-side rotation speed becomes smaller than a fifth threshold value at time t3, it is determined that the slip of the low brake 32 has converged. Then, the discharge pressure of the electrical oil pump 10e is changed to the first discharge pressure calculated based on the deceleration.

Effects of the second embodiment of the present invention are described.

The discharge pressure of the electrical oil pump 10e is decreased with an increase in the deceleration in the case of slow deceleration while being increased with an increase in the deceleration in the case of quick deceleration. This can suppress the slip of the low brake 32 according to the deceleration. Further, it is possible to suppress an increase in the discharge pressure of the electrical oil pump 10e more than necessary, suppress power consumed by the electrical oil pump 10e and suppress deterioration of fuel economy. Further, a reduction in the durability of the electrical oil pump 10e can be suppressed.

An increment from the first discharge pressure to the third discharge pressure at slow deceleration is made larger than that from the first discharge pressure to the fourth discharge pressure at quick deceleration. This can suppress a sense of discomfort given to the driver if the coast stop control is canceled and the low brake 32 is suddenly engaged due to the restart of the engine 1 before the slip of the low brake 32 converges at slow deceleration. Further, at quick deceleration, it is possible to suppress power consumed by the electrical oil pump 10e and suppress deterioration of fuel economy while suppressing the slip of the low brake 32.

"To detect a slip" in the present embodiment includes a state where a slip is actually occurring in the low brake 32 and a state where the occurrence of a slip in the low brake 32 is predicted. Although the slip of the low brake 32 is detected based on the output signals obtained by the rotation speed sensor 42 and the vehicle speed sensor 43 in the above embodiments, the slip of the low brake 32 may be predicted based on the deceleration of the vehicle. The deceleration of the vehicle can be detected not only by the G-sensor 47, but also by hydraulic sensors such as the brake fluid pressure sensor 46 and the low brake 32. This enables the slip of the low brake 32 to be detected without using the rotation speed sensor 42 and the like. In the case of predicting the slip of the low brake 32, the slip of the low brake 32 may be foreseen according to an operating state such as brake depression and the discharge pressure of the electrical oil pump 10*e* may be increased. If the input-side rotation speed and the output-side rotation speed are equal and the slip of the low brake 32 is predicted, the discharge pressure of the electrical oil pump 10*e* is set to the third discharge pressure that is a discharge pressure at slow deceleration. This is because such a situation often occurs immediately before the vehicle stops and slow deceleration is predicted.

Although a slip in the low brake 32 has been detected in the above embodiments, there is no limitation to this. The discharge pressure of the electrical oil pump 10*e* may be controlled by detecting the slip of the variator (power transmission means) 20 based on stroke amounts of the pulleys 21, 22, the rotation speeds of the pulleys 21, 22 or the like. This can suppress degradation of the variator 20. Further, without being limited to the low brake 32, the discharge pressure of the electrical oil pump 10*e* may be controlled for the slip of another frictional engagement element.

Further, the discharge pressure of the electrical oil pump 10*e* may be increased a plurality of number of times. The electrical oil pump 10*e* is driven due to the coast stop control from a point of time when the vehicle is at a relatively low speed until the vehicle stops, whereas the electrical oil pump 10*e* is driven due to the idle stop control from a point of time when the vehicle stops until a start request is made. In the idle stop control, the electrical oil pump 10*e* is driven for a long time if a start request is not made by a driver for a while after the vehicle stops. As just described, since a driving time of the electrical oil pump 10*e* due to the coast stop control is shorter than, for example, that of the electrical oil pump 10*e* due to the idle stop control, an influence on the durability of the electrical oil pump 10*e* is small. Thus, the electrical oil pump 10*e* may be driven to have a maximum discharge pressure. If the slip of the low brake 32 does not converge even when the discharge pressure of the electrical oil pump 10*e* is set to the second discharge pressure (third discharge pressure, fourth discharge pressure), the discharge pressure of the electrical oil pump 10*e* is further increased, e.g. the maximum discharge pressure of the electrical oil pump 10*e* is set, thereby making it possible to cause the slip of the low brake 32 to converge and suppress the occurrence of an engagement shock when the engine 1 is restarted. If the slip of the low brake 32 does not converge even when the discharge pressure of the electrical oil pump 10*e* is increased from the first discharge pressure, an output value of the G-sensor 47 and a value of the actual deceleration may not completely coincide. For example, if the value of the G-sensor 47 has a response delay by being filtered, the discharge pressure of the electrical oil pump 10*e* becomes lower than an originally required pressure. This is particularly likely to occur when an irregularity of a road surface is large. In such a case, the slip of the low brake 32 can be suppressed by further increasing the discharge pressure of the electrical oil pump 10*e*.

Although the embodiments of the present invention have been described above, the above embodiments are only an illustration of some application examples of the present invention and not intended to limit the technical scope of the present invention to the specific configurations of the above embodiments.

This application claims a priority of Japanese Patent Application No. 2011-132429 filed with the Japan Patent Office on Jun. 14, 2011, all the contents of which are hereby incorporated by reference.

The invention claimed is:

1. A coast stop vehicle for stopping a drive source during vehicle running, comprising:
   a power transmission unit arranged between the drive source and drive wheels;
   a coast stop control unit configured to execute a coast stop control to stop the drive source when a coast stop condition for stopping the drive source holds during the vehicle running;
   an electrical oil pump configured to supply oil to the power transmission unit during the coast stop control;
   a slip detection unit configured to detect a slip in the power transmission unit during the coast stop control; and
   an electrical oil pump control unit configured to, when the slip occurs in the power transmission unit during the coast stop control, cause the electrical oil pump to discharge a second discharge pressure that is higher than a first discharge pressure, the first discharge pressure being set before the slip in the power transmission unit occurs.

2. The coast stop vehicle according to claim 1, wherein:
   the power transmission unit is a frictional engagement element.

3. The coast stop vehicle according to claim 1, comprising:
   a first rotation speed detection unit configured to detect an input-side rotation speed of the power transmission unit; and
   a second rotation speed detection unit configured to detect an output-side rotation speed of the power transmission unit;
   wherein the slip detection unit detects the slip based on a deviation between the input-side rotation speed and the output-side rotation speed.

4. The coast stop vehicle according to claim 1, comprising:
   a deceleration detection unit configured to detect a deceleration of the vehicle;
   wherein the slip detection unit detects the slip based on the deceleration.

5. The coast stop vehicle according to claim 1, comprising:
   a deceleration detection unit configured to detect a deceleration of the vehicle;
   wherein the electrical oil pump control unit decreases the second discharge pressure with an increase in the deceleration of the vehicle if the slip is a first slip in which an input-side rotation speed of the power transmission unit is lower than an output-side rotation speed of the power transmission unit, and increases the second discharge pressure with an increase in the deceleration of the vehicle if the slip is a second slip in which the output-side rotation speed of the power transmission unit is lower than the input-side rotation speed of the power transmission unit.

6. The coast stop vehicle according to claim 5, wherein:
   an increment from the first discharge pressure to the second discharge pressure in the first slip is larger than that from the first discharge pressure to the second discharge pressure in the second slip.

7. The coast stop vehicle according to claim 1, wherein:
   the second discharge pressure is lower than a maximum discharge pressure of the electrical oil pump.

8. The coast stop vehicle according to claim 1, wherein:
   the electrical oil pump control unit causes the electrical oil pump to discharge a pressure that is higher than the second discharge pressure when the slip occurs even if the second discharge pressure is caused to be discharged from the electrical oil pump.

9. The coast stop vehicle according to claim 1, comprising:
a slip convergence determination unit configured to determine whether or not the slip in the power transmission unit has converged during the coast stop control;
wherein the electrical oil pump control unit sets the discharge pressure of the electrical oil pump to the first discharge pressure if the slip has converged.

10. The coast stop vehicle according to claim 1, wherein:
the power transmission unit is a variator including a primary pulley on an input side whose groove width is changed by a hydraulic pressure, a secondary pulley on an output side whose groove width is changed by the hydraulic pressure and a power transmission member mounted on the primary pulley and the secondary pulley.

11. A control method for a coast stop vehicle for stopping a drive source during vehicle running, comprising:
controlling the coast stop vehicle, the coast stop vehicle comprising
a power transmission unit arranged between the drive source and drive wheels; and
an electrical oil pump configured to supply oil to the power transmission unit during a coast stop control;
executing the coast stop control to stop the drive source when a coast stop condition for stopping the drive source holds during the vehicle running;
detecting a slip in the power transmission unit during the coast stop control; and
causing the electrical oil pump to discharge a second discharge pressure that is higher than a first discharge pressure when the slip occurs in the power transmission unit during the coast stop control, the first discharge pressure being set before the slip in the power transmission unit occurs.

12. A coast stop vehicle for stopping a drive source during vehicle running, comprising:
a power transmission unit arranged between the drive source and drive wheels;
a coast stop control unit executing a coast stop control to stop the drive source when a coast stop condition for stopping the drive source holds during the vehicle running;
an electrical oil pump configured to supply oil to the power transmission unit during the coast stop control;
a slip detection unit detecting a slip in the power transmission unit during the coast stop control; and
an electrical oil pump control unit causing the electrical oil pump to discharge a second discharge pressure that is higher than a first discharge pressure when the slip occurs in the power transmission unit during the coast stop control, the first discharge pressure being set before the slip in the power transmission unit occurs.

* * * * *